United States Patent [19]
Mendenhall

[11] Patent Number: 5,390,590
[45] Date of Patent: Feb. 21, 1995

[54] APPARATUS FOR BREAKING AND CORING FOOD PRODUCTS

[76] Inventor: George A. Mendenhall, 4252 S. Eagleson Rd., Boise, Id. 83705

[21] Appl. No.: 84,521

[22] Filed: Jun. 29, 1993

[51] Int. Cl.⁶ .......................... A47J 25/00; B26D 1/03
[52] U.S. Cl. ........................................ 99/537; 83/98; 83/402; 99/536; 99/544; 99/547
[58] Field of Search .................... 99/537, 538–546, 99/547, 516, 536; 426/518; 83/22, 24, 98, 112, 402, 149, 164, 425.2, 856, 858

[56] References Cited

U.S. PATENT DOCUMENTS

| | | | |
|---|---|---|---|
| 3,109,468 | 11/1963 | Lamb et al. | 146/78 |
| 3,116,772 | 1/1964 | Lamb et al. | 146/241 |
| 3,361,173 | 1/1968 | Lamb | 146/240 |
| 3,563,289 | 2/1971 | Altman | 99/563 |
| 4,112,837 | 9/1978 | Altman et al. | 99/537 |
| 4,252,056 | 2/1981 | Altman | 99/544 |
| 4,337,693 | 7/1982 | Dandrea | 99/545 |
| 4,372,184 | 2/1983 | Fisher et al. | 83/98 |
| 4,423,652 | 1/1984 | Winslow | 83/24 |
| 4,807,503 | 2/1989 | Mendenhall | 83/22 |
| 5,101,718 | 4/1992 | Lin | 99/537 |

*Primary Examiner*—Timothy F. Simone
*Attorney, Agent, or Firm*—Frank J. Dykas; Craig M. Korfanta

[57] ABSTRACT

A toroidal shaped impact assembly (10) for use in a hydraulic food cutting system is disclosed. Impact assembly (10) includes frustum shaped housing (22), an attachment plate (28) for mounting the assembly within a hydraulic food assembly, and a toroidally shaped impact ring (20). Food products such as peppers (12) are suspended in water and accelerated into assembly (10) where the aligned whole peppers impact against ring (20) thereby breaking apart into food pieces and an unattached seed pod or core.

4 Claims, 4 Drawing Sheets

APPARATUS FOR BREAKING AND CORING FOOD PRODUCTS

BACKGROUND OF THE INVENTION

1. Technical Field

This invention generally relates to a method and apparatus for removing the cores from food products and for breaking food products into smaller pieces. More particularly, this invention relates to a toroidal shaped impact assembly for use in a hydraulic food cutting machine.

2. Background Art

Peppers, more particularly bell peppers, of whatever color, red, green or yellow, jalapeno peppers and pimento peppers have traditionally been thought of as vegetables. They are actually a fruit, in that they are the developed ovary of the blossom of the flowering plant. As such, they are connected at one end to the stem of the blossom, and at the other end, the blossom end, are found the remains of the petals and stamen of the original blossom. Contained within the developed ovary, or fruit, are the developed seeds caused by fertilization of the ovule that were originally contained within the undeveloped ovary.

Commercial processing of peppers has always been a difficult, labor intensive and time consuming process. The primary problem was how to remove the pepper core consisting of the stem end, seed pod and seeds, hereinafter collectively referred to as the core. Two basic methods have been developed to core peppers.

The first method involves the use of some sort of a rotating coring knife, over which the pepper is positioned, stem down, so that the coring knife can bore in cutting out the core and the seed pod. The second method is in more common use today, particularly where there is no need to retain the original configuration of the pepper as a unitary piece. This method involves crushing the peppers and then hand sorting out either the broken usable pieces, or the opposite, hand separating the remains of the cores. The broken pieces are then washed and usually conveyed on for further processing, such as dicing, for inclusion in prepared food products whether canned, frozen, freeze dried or whatever.

A common characteristic to peppers which enables the crushing process to be used, is the fact that the wall of the pepper is brittle enough in its cellular composition that it will break, after some initial plastic deformation, if enough force is impacted against the wall of the pepper.

These two prior art methods and processes for coring peppers can generally be described as mechanical approaches, since they both involve the use of mechanical machines to either crush the peppers or to bore out the stem and core.

Not used in the prior art is a second category of food cutting apparatus, generally known as the hydraulic food cutter. Hydraulic food cutters are used primarily in the potato industry to cut french fries. In general terms, they include a vortex or feed tank containing water into which whole potatoes are conveyed and dumped. A centrifugal food pump draws suction from the tank, and pumps the water and suspended potatoes into an acceleration tube, which is the converging end of the venturi. The food product is then accelerated in the venturi, and impinges upon a fixed array of stationary blades which cut the potato into pieces, usually french fries. The cut food pieces and water then pass into a deceleration tube, which is the divergent end of the venturi, from where they are deposited onto a dewatering conveyor.

The water passes through the dewatering conveyor to a collection tray, and is eventually recycled back into the feed tank. The cut food pieces, or french fries, do not pass through the conveyor, and are conveyed off for further processing.

Hydraulic food cutting devices are high capacity cutting machines and are not labor intensive, usually only requiring one operator to monitor hydraulic cutter operation.

Hydraulic food cutting devices have not been used in the past to cut peppers because of the absence of a workable cutting blade for peppers.

An object of the present invention is to develop an impact assembly which can be used within a hydraulic cutter machine for purposes of breaking peppers into pieces and removing the cores and seed pods therefrom. The second object of the present invention is to develop a modified hydro cutting system wherein the dewatering conveyor can be used for enhanced seed separation and a flotation tank can be used for core and stem separation.

Another object of the present invention is to provide an apparatus that can be used to concentrate the number of solids suspended in a fluid medium flowing through a venturi without significantly reducing the speed of pressure parameters of the fluid as it passes through the venturi.

DISCLOSURE OF INVENTION

These objects are achieved through the use of a toroidal impact assembly having a frustum shaped housing formed integral with an attachment flange adapted for insertion and use within a hydraulic food cutting assembly. The housing forms a converging conical food passageway for the passage of whole food products, such as peppers, suspended in a fluid medium, such as water, from the larger upstream end of the passageway to the smaller downstream end. Attached to the downstream end of the housing is a toroidally shaped impact ring against which whole food products impact as they are carried through the passageway by the moving fluid.

As peppers impact against the toroidal impact ring they break apart into pieces of pepper, the core with some attached seeds, and loose seeds. The suspension of now broken pepper pieces, seeds, and pepper cores then passes through the central orifice in the impact ring into a decelerating tube and then onto a dewatering conveyor where the cut food pieces and cores are collected and carried away, while the loose seeds pass through still in suspension within the fluid medium or water.

The seeds are then filtered from the water prior to the water being recycled for further use in the hydraulic cutting assembly.

The mixture of dewatered cut food pieces and cores are then deposited into a settling tank filled with water. The cores, being buoyant, float to the top of the tank, while the cut food pieces, not being buoyant, settle to the bottom. The cut food pieces are then drawn off through a suction line located near the bottom of the settling tank and the remaining cores and seeds by another suction line or a chain conveyor located at the top of the settling tank.

Bypass ports are provided in the sides of the conical housing to allow for the increased passage of water through the toroidal impact assembly and are sized to maintain fluid pressure and flow rate through the toroidal impact ring matched to the design characteristics of the particular hydraulic food cutting system food pump.

BEST MODE FOR CARRYING OUT INVENTION

While the present invention is shown and described in this specification in the context of an apparatus for coring and breaking peppers, the toroidal impact assembly herein described has a variety of other applications to which it can be put to good use. Although the best mode contemplated by the inventor at the present time is the use of the toroidal impact assembly 10 for processing whole peppers, other uses are envisioned. For example, another use to which the present invention could be applied, is the impacting of food products against the toroidal impact assembly 10 in a hydraulic cutting system to peel off the skin of a fruit. In fact, the present invention, when configured with bypass ports 30, as later described in this specification, functions not only as a food processing tool, but also as a concentrator of suspended solids within a fluid medium. As a consequence, while this specification describes the present preferred best mode embodiment of the invention, it is to be understood that this invention is not limited thereto but may be variously embodied to practice within the scope of the following claims.

Figure 1:
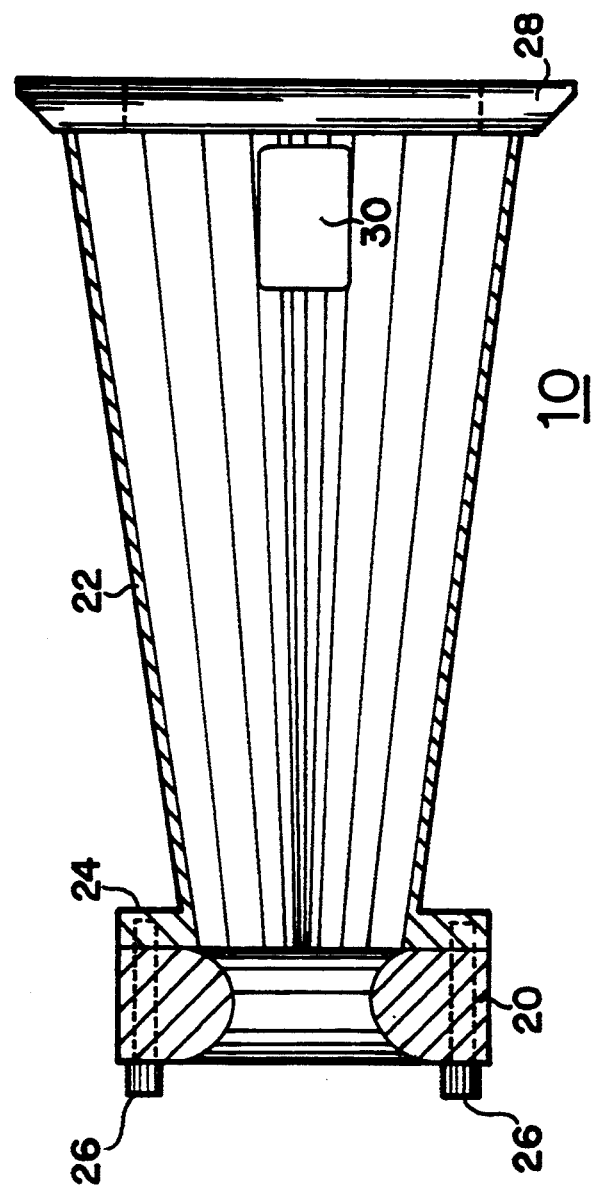
FIG. 1 is a sectional side view of the toroidal impact assembly.
Figure 2:
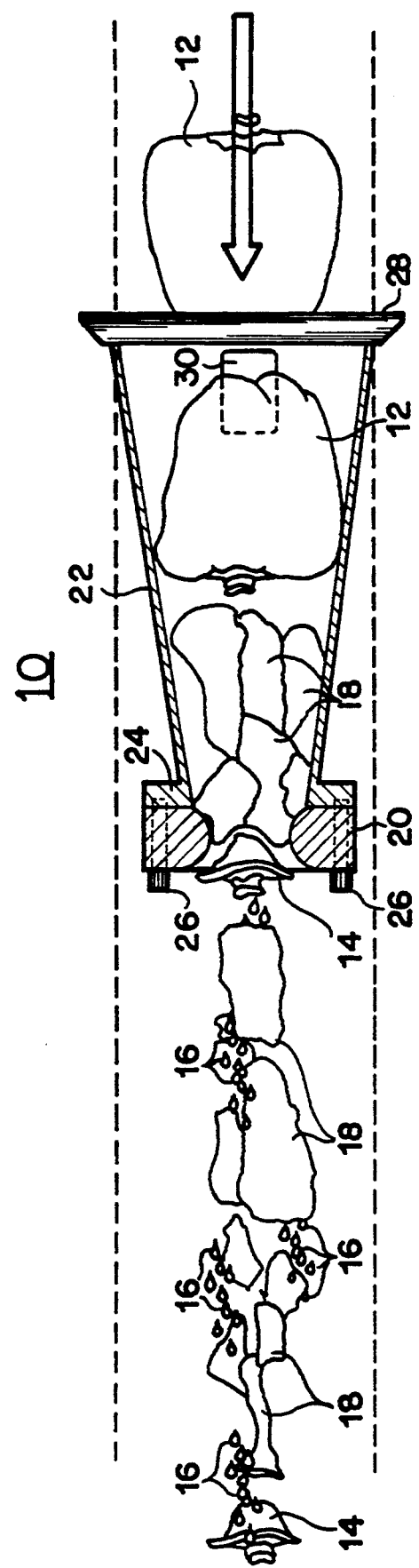
FIG. 2 is a representational sectional side view of the toroidal impact assembly breaking up bell peppers.
Figure 3:
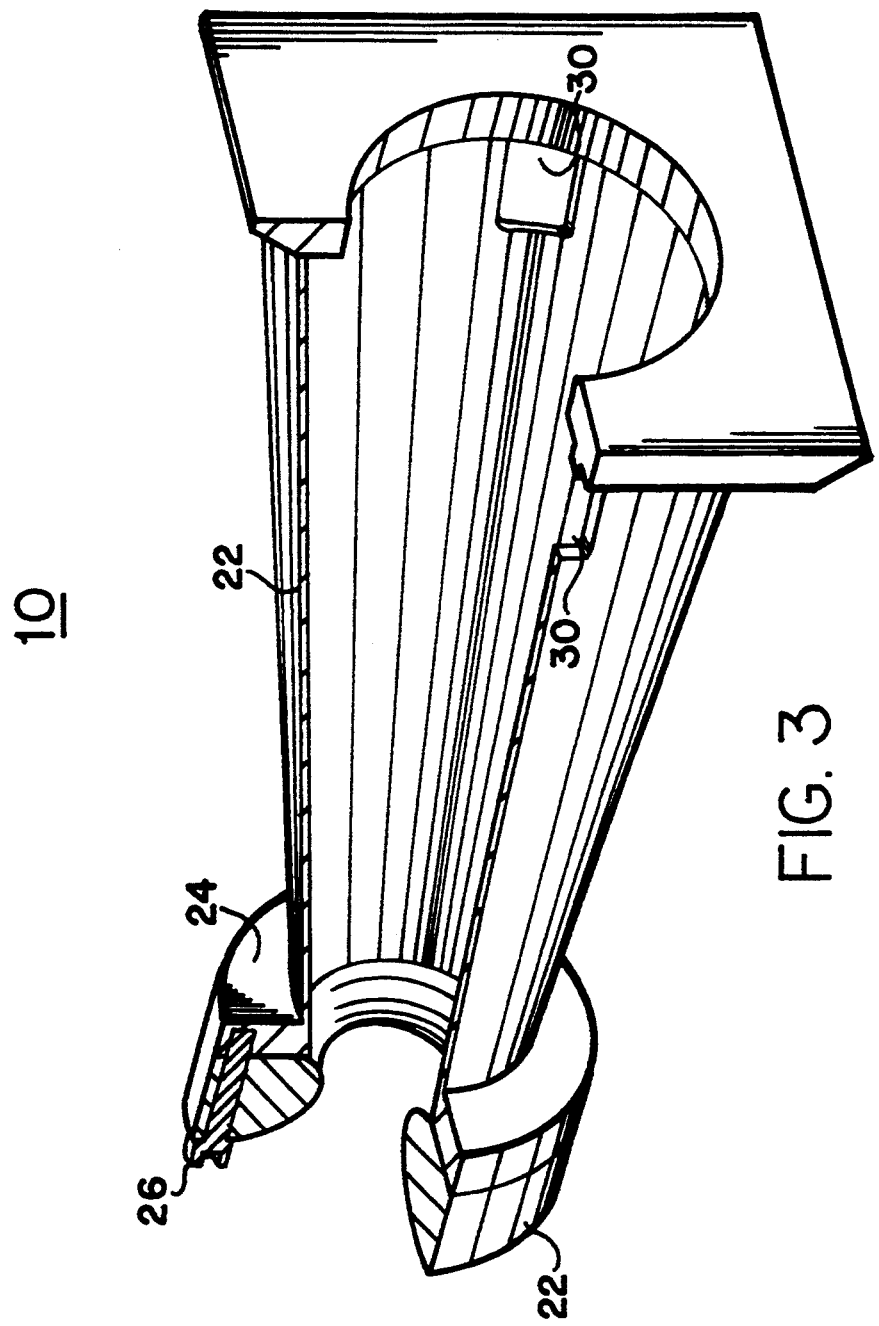
FIG. 3 is a perspective representational, sectional view of the toroidal impact assembly.

As shown in FIGS. 1, 2 and 3, toroidal impact assembly 10 is formed of just three parts. These are a frustum shaped housing 22 which has formed integral therewith impact ring attachment flange 24 and attachment plate 28. The housing forms a longitudinal passageway for the passage of food products suspended in a liquid, which is usually water in a hydro cutting system. As shown in FIGS. 2 and 3, attachment plate 28 defines the upstream end through which food product, namely peppers, enter into the longitudinal passageway. At the downstream end, defined by impact ring attachment flange 24, there is attached by means of bolts 26 a toroidal shaped impact ring 20. In the preferred embodiment, housing 22, attachment plate 28 and impact ring attachment flange 24 are formed of stainless steel and impact ring 20 of ultra high molecular weight polyethylene.

As shown in FIGS. 1, 2 and 3 a pair of water bypass ports 30 are provided for reasons that will be described later in this specification.

Figure 4:
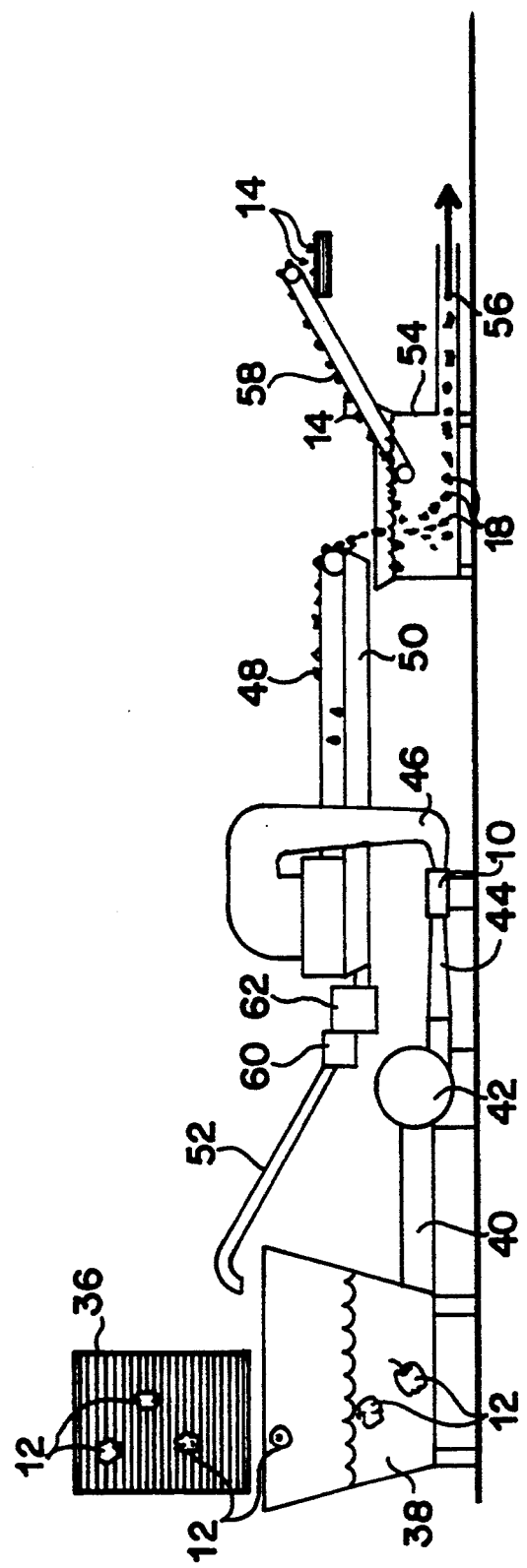
FIG. 4 is a schematic representation of the toroidal impact assembly in use within a hydro cutting system.

FIG. 4 shows, in schematic representational format, a hydro cutting system which uses to advantage the toroidal impact 10. In this hydro cutting system, whole peppers 12 are delivered to, and dropped into, vortex tank 38 by means of infeed conveyor 36. Vortex tank 38 contains system water which may or may not be treated. Whether or not the water is treated is not particularly relevant to the operation of the system, and in practice it has been found that plain, room-temperature fresh water will work satisfactorily. The whole peppers 12, once deposited in the tank, are drawn in suspension with water, through suction line 40 into centrifugal food pump 42 and then into accelerator tube 44. Accelerator tube 44 is actually the convergent portion of a venturi formed of accelerator tube 44, toroidal impact assembly 10, and decelerator tube 46. The purpose of accelerator tube 44 is to speed up the water flow so that peppers 12 are entering the longitudinal passageway of conical housing 22 at a speed of approximately 30 to 70 feet per second. In practice, it has been found that 50 to 60 feet per second appears to be optimal speed. Peppers 12, as shown in FIG. 2, will enter housing 22 either stem end, or blossom end, first. In practice it appears to be irrelevant which direction the pepper is pointing at the time it enters housing 22. At the convergent discharge end of housing 22 the whole pepper 14 impacts against the surfaces of impact ring 20 which imparts enough stress to pepper 12 to cause its structure to break up into a plurality of pieces, with pepper core 14 becoming detached from the remaining broken pepper pieces 18. In a literal sense, stem and core 14 are literally popped out of the whole pepper. The broken pieces 18, core and stem 14, and loose pepper seeds 16 then pass through the central opening or orifice in toroidal impact ring 20 into the decelerator tube 46 where water flow is slowed down.

In practise it has been found that the diameter of the core for a given plant variety remains fairly consistant irrespective of differences in actual product size. The impact ring 20 is sized to be larger than the core diameter, but not too much larger, Generally the oriface is sited to 110% of average core diameter, but the impact assembly will work adequately at least within the range of 100% to 125% of core diameter size.

The decelerated water and the suspended cores 14, broken pepper pieces 18 and seeds 16 are then dumped onto dewatering conveyor 48. The water and pepper seeds 16 pass through the conveyor into water collection tray 50 while the broken pepper pieces 18 and cores 14 are conveyed off and dumped into settling tank 54.

The water collected in water collection tray 50 is then pumped through water return pump 62 through seed filter 60 and water return line 52 back to the vortex tank 38 where it is reused.

As previously stated, the mixture of cut pepper pieces 18 and cores 14 are dumped into settling tank 54. The cores 14 are buoyant and float at the top of the settling tank. The cut pepper pieces 18 are heavier than water, and quickly settle to the bottom of settling tank 14. This factor enables automatic separation, by water, with the cut pepper pieces 18 being drawn off by means of a pump, not shown, through food piece draw-off line 56, and the pepper cores 14 by means of core conveyor 58.

As previously stated, bypass ports 30 are included in the preferred embodiment. However, toroidal impact assembly 10 will function without the bypass ports. The purpose of the bypass ports is to increase water flow, thereby enabling an increase in production capacity. As previously stated, one of the primary objects of using a hydro cutting system to break up and decore whole peppers, is to provide a system which is not labor intensive and produces high volumes of cut food product. Therefore, an object is to maximize the number of pounds per hour of food product which can be passed through the hydro cutting system. There are two variables in increasing the pounds per hour passing through the hydro system, the first is to increase the concentration of suspended food product in the water being pumped through the system, and the second is to increase the flow rate of water through the system. In practice it has been found that a suspension of one pound of peppers per gallon of water in the hydro system works effectively. In the case of small peppers, such as jalapeno peppers, this results in more peppers per gallon, and in bell peppers, fewer peppers per gallon. At this ratio of poundage of food product to water, food pump 42 works effectively, the products are properly aligned and separated in accelerator tube 44 and the system does not plug with food product. Of course, lower concentrations of food product to water can be used, however, this would serve no purpose other than to decrease the efficiency or cutting capacity of the hydro system. This ratio of one pound of food product to water is variable to some extent over a range.

In theory, the maximum capacity of the hydro system is only limited by the time that it takes for the food product to impact the toroidal impact ring, break apart, and pass through the central orifice of the ring into the deceleration loop. If the food products are fed into the toroidal impact assembly 10 at a rate which exceeds the rate at which they impact, break up, and pass through, then, under standard queuing theory, the incoming peppers will impact upon each other, backing up, slowing down, and causing a system plug in accelerator tube 44. Under optimal operating conditions, the food product or peppers should be fed into the system and into acceleration tube 44 at a steady stream, spaced far enough apart so that each one independently impacts toroidal impact assembly 10, breaks apart and passes through just a few milliseconds before the next pepper impacts.

Therefore, to increase the capacity of the hydro system, the number of gallons of water flowing through the system must be increased. This is the second method of increasing capacity.

However, as with any venturi, there is a relationship between input pressure and velocity through the apex of the venturi. Thus, pumphead pressure must be increased in order to increase the volume of water flowing through the venturi. This is a problem, since food pumps are invariably impeller blade centrifugal pumps and the pressure required to pump the maximum designed gallonage of water and suspended food product through the hydro system usually exceeds an efficient operating pumphead pressure for the pump.

Bypass ports 30 are means of diverting some of the water, but not the whole food product, from passing through the impact ring. This, in turn, enables the use of a high-capacity single impeller centrifugal food pump which is designed and operated at a speed to pump the maximum number of peppers into the accelerator tube 44, while at the same time reducing the amount of water having to pass through the venturi of toroidal impact assembly 10, thereby reducing the system pressure, so that the proper number of peppers are fed, at the proper rate, into impact head assembly 10.

The water flow within the venturi is very turbulent, particularly when configured with bypass ports 30. The study of this type of water flow is the study of hydrodynamics. At the present time it is not yet feasible, and perhaps impossible to mathematically model exactly what is happening in impact assembly 10. As a result the sizing of bypass ports 30 is empirically determined. In general the sizing of the bypass ports 30 is determined by matching the desired gallonage of water and pressure from the pump head curve of the centrifugal food pump 42 to a known orifice size, for example an orifice with a three and one half inch diameter. The total cross sectional area of the bypass ports 30 can then be determined as the difference in cross sectional area between the reference orifice and the actual area of the orifice provided in toroidal impact ring 20. For example, if the reference orifice has a diameter of three and one half inches, it has a cross sectional area of nine and six-tenths square inches. And, if the desired orifice size for toroidal impact cutter 20 is a one inch diameter, then bypass ports having a total cross sectional area of approximately six and one-half inches should be included to provide for the gallonage flow and the same pump head pressure as that provided in the reference orifice size.

In practice it has been found that this method of determining the sizing of the bypass ports works adequately. It has also been found that the flow of fluid, whole food pieces and broken food pieces is so turbulent that broken food pieces will actually backflow within housing 22 and pass through the bypass ports 30 into decelerator tube 46. This has not been found to create overburdening problems of quality control and for that reason no attempt is made to screen bypass ports 30. Although is should be pointed out that screening the bypass ports is possible. In fact it is apparent that screening the bypass ports, and even adding a wiper blade assembly would be desirable in certain applications.

From a conceptual point of view the net effect of the converging housing 22 and the bypass ports 30 is a means and a method of concentrating a suspension of solids in a fluid while at the same time providing for no reduction in the rate of fluid flow through the convergent end of the venturi. In the present application, this is what is happening in that it allows an increase in the volume of water being pumped at a given pressure and thereby increasing the number, or rate at which food products are being introduced into the hydraulic food cutter system. And then, within housing 22, increasing the concentration of food product without a reduction in velocity by allowing fluid to pass out of the mainstream flow through bypass ports 30.

It should also be pointed out that the exact location for siting of bypass ports 30 is not necessarily critical. All that is required is that they be located somewhere within the venturi convergence zone. Nor is the exact shape of the bypass ports 30 critical to the present invention. Slots, rectangular or circular holes will all work reasonably well. Since, as previously stated, the hydrodynamic events occurring within the housing are so complicated, the exact configuration of bypass ports 30 is a matter best left to empirical design. It should also be pointed out that the bypass ports 30 can be configured at the very beginning of housing 22, and incorporated into the design of attachment flange 24.

The principles of this present invention could easily be applied to concentrate virtually any suspension of solids in fluid.

While there is shown and described the present preferred embodiment of the invention, it is to be distinctly understood that this invention is not limited thereto but may be variously embodied to practice within the scope of the following claims.

I claim:

1. In a hydraulic food cutting system having a feed tank for holding a suspension of food products in a fluid, a fluid and suspended food product passageway defined by an acceleration tube for accelerating a suspension of food products in the fluid received from the feed tank, a cutter assembly housing, means for decelerating a suspension of the fluid and food pieces, means for separating the fluid from the food pieces, and a centrifugal pump, having known pump head curve characteristics, for pumping a suspension of food products and fluid through the fluid and suspended food product passageway, an impact assembly which comprises a frustum shaped housing having a passageway therethrough for the passage of food product suspended in a fluid from a larger upstream end to a smaller downstream end;

a toroidal shaped impact ring having a central opening, attached, with its central opening in alignment with the food product passageway, to the downstream end of the housing.

2. The impact cutter assembly of claim No. 1 which further comprises means for bypassing fluid around the toroidal shaped impact ring.

3. The impact cutter assembly of claim No. 2 wherein said means for bypassing fluid is the frustum shaped housing having a plurality of bypass ports formed therethrough.

4. The impact cutter assembly of claim No. 2 wherein said means for bypassing fluid further includes means for regulating the amount of fluid bypassed to maintain fluid flow and pressure at a preselected point on the pump head curve.

* * * * *